May 3, 1955
C. J. OTT
2,707,651
HOT POTATO HOLDER
Filed Aug. 16, 1950
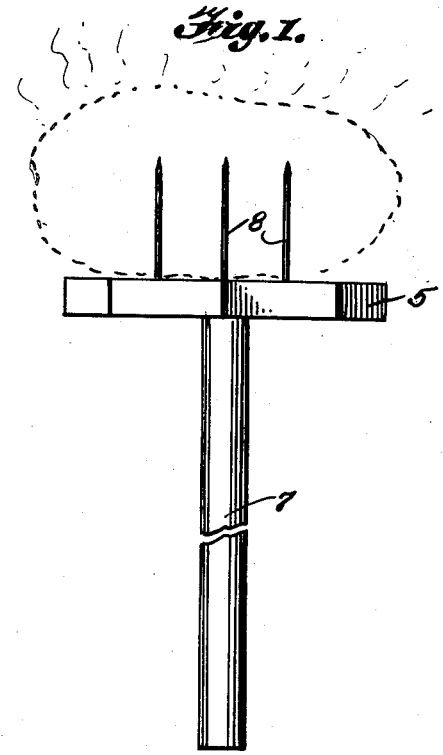
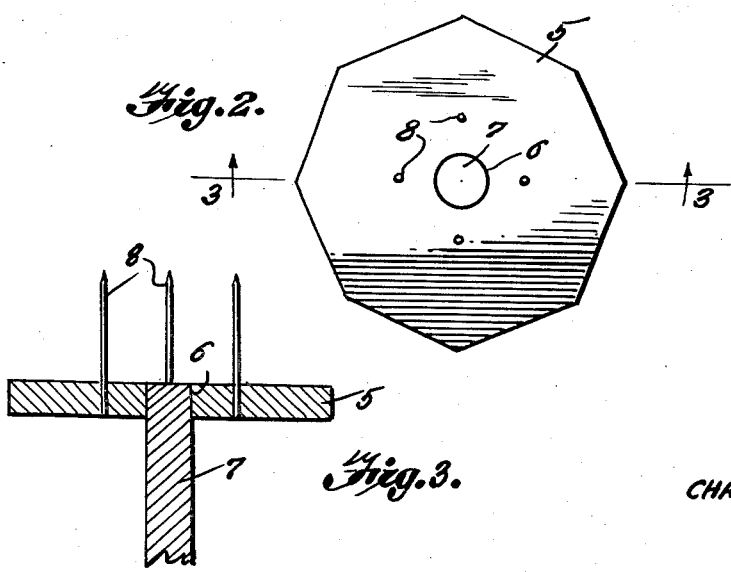
Inventor
CHARLES J. OTT
Patrick D. Beavers
Attorney United States Patent Office

2,707,651
Patented May 3, 1955

---

2,707,651

HOT POTATO HOLDER

Charles J. Ott, Saugerties, N. Y.

Application August 16, 1950, Serial No. 179,736

1 Claim. (Cl. 294—61)

The present invention relates to improvements in devices for holding hot potatoes while they are being peeled.

The principal object of the present invention is to provide a hot potato peeler which is composed of very brief details, capable of being primarily constructed at a very low monetary cost and assembled easily.

Another important object of the invention is to provide a very simplified hot potato holder, which is capable of being retailed at a very low monetary figure, to the end that practically every housewife can possess one.

A further object of the invention is to provide a simplified hot potato holder which will prevent the hands of the person using the same from becoming burned and which will adequately hold a potato and prevent the same from breaking apart during the peeling thereof.

These and various other objects and advantages of the invention will become apparent to the reader of the following description.

In the drawing:

Figure 1 is a side elevational view of the holder showing a potato supported thereby, this potato being shown in broken lines.

Figure 2 is a top plan view of the holder.

Figure 3 is a fragmentary sectional view taken substantially on line 3—3 of Figure 2.

Referring to the drawings wherein like numerals designate like parts, it can be seen that numeral 5 denotes a platform or plate of any desired shape, such as round, square, octagon or some other polygonal formation. The center of this plate 5 has an opening 6 for receiving the upper end of a handle 7. This handle may be of cylindrical form or of any other desired shape.

Spaced outwardly from the opening 6 are a number of small openings for receiving securely the lower ends of upstanding tines 8, the upper ends of which are pointed.

The tines 8 are preferably metallic, but the plate 5 and the handle 7 may be of wood or any other suitable and inexpensive material.

It will be observed that the tines 8 are of sufficient height to pass about one-half the way through a potato of average size lying flatly on the plate 5, thus to the end that the tines will not interfere with the peeling operation.

A hot potato is placed on the plate 5 and over the tines 8 by holding the potato in a towel or hand protector. The potato is pressed down until it is against the plate 5 and is then in a position to be peeled.

After the potato has been peeled, the holder can be inverted and the tines 8 pulled out of the potato and another potato disposed in place for a repeat operation, of peeling.

While the foregoing description sets forth the invention in specific terms, it is to be understood and numerous changes in the shape, size and materials may be resorted to without departing from the spirit and scope of the invention as claimed hereinafter.

Having described the invention what is claimed as new is:

A hot potato holder comprising a potato supporting plate, upstanding potato piercing tines on the plate, said tines being rigidly affixed to the plate, said plate having an opening and a handle depending from the plate and having its upper end fixed in said opening.

References Cited in the file of this patent

UNITED STATES PATENTS

| | | |
|---|---|---|
| 201,230 | Yongh | Mar. 12, 1878 |
| 583,412 | Collins | May 25, 1897 |
| 931,587 | Fairbanks | Aug. 17, 1909 |
| 1,053,418 | Martin | Feb. 18, 1913 |
| 1,523,633 | Cousar et al. | Jan. 20, 1925 |
| 1,969,601 | Foch | Aug. 7, 1934 |
| 1,993,314 | Belford | Mar. 5, 1935 |
| 2,500,647 | Schulthess | Mar. 14, 1950 |